Figure 1:
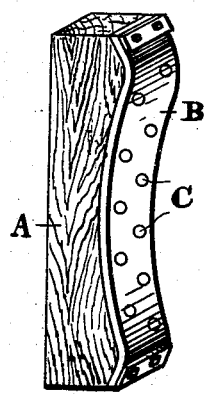

H. FROOD.
MEANS FOR SECURING BRAKE LININGS TO THEIR FOUNDATION BLOCKS.
APPLICATION FILED SEPT. 1, 1914.

1,180,026. Patented Apr. 18, 1916.

UNITED STATES PATENT OFFICE.

HERBERT FROOD, OF BUXTON, ENGLAND.

MEANS FOR SECURING BRAKE-LININGS TO THEIR FOUNDATION-BLOCKS.

1,180,026. Specification of Letters Patent. Patented Apr. 18, 1916.

Application filed September 1, 1914. Serial No. 859,618.

*To all whom it may concern:*

Be it known that I, HERBERT FROOD, a subject of the King of Great Britain and Ireland, and a resident of Buxton, in the county of Derby, England, have invented certain new and useful Improved Means for Securing Brake-Linings to Their Foundation-Blocks, of which the following is a specification.

In certain uses of brake shoes, linings, and other frictional substances composed of non-metallic substances, such, for example, as woven textile fabrics impregnated with cementitious substance and baked or stoved, it has been necessary to peg or pin the frictional substance down on to a block, back, or foundation by means of non-metallic pins or pegs which pass through the brake lining or the like from its operative face to and into the foundation or the like. The heads of the pins or pegs, either as driven in place or after being cut off flush with the surface of the fabric, then form part of the frictional surface.

It is of very great importance with a brake built up as described with the indicated substance that there should be no movement of the frictional substance or displacement of its surface relatively to the brake block foundation or the like or the gear operating the same, in order that the brake surface may be brought into use as accurately as if the frictional surface were solid or integral with the block or foundation. It is also of very great importance that a composite surface of treated fabric and material of the pegs shall remain constant.

Pegs or pins suitable for use for securing a textile brake lining or the like in place and for ultimately forming part of the frictional surface are of wood and preferably of ash. It has been found in practice that when such pegs or pins having cross sectional forms which correspond to the cross sectional forms of the holes into which they fit are driven tightly into holes in a foundation block which are closed at their bottoms, such pins soon work outward or are displaced outward and become loose. As a result of this the frictional fabric is not held firmly upon its block and the ends of the pegs or pins may project above the surface of the frictional fabric, so that the brake surface which first comes into action would consist of the ends of the pegs or pins, followed in action, later, by a brake surface of prepared fabric. There would be no certainty as to which brake surface was being brought into operation at any one application of the brake, and the braking results obtained would be variable and uncertain. Investigation has shown me that this outward displacement of a peg or pin is caused chiefly or entirely by the pressure of air which cannot escape from the hole and is highly compressed between the leading end of the pin and the bottom of the hole when the pin is driven home.

This invention consists in providing means for preventing such air compression between the bottom of a hole in a brake block and the end of a pin, and in carrying it into effect a vent which communicates with the bottom of a hole and with the atmosphere is provided. Such a vent may be provided by forming the peg or pin with an air passage extending axially or otherwise from end to end and of such a nature as not to be closed when driven in place in the fabric and foundation block; or a vent hole may be bored from the surface of the block or fabric to the bottom of the hole, or any or all of these devices may be used in combination.

A wooden peg or pin for use according to this invention preferably has a shank or stem circular in cross section and cylindrical, although it may be slightly tapered toward or at its leading end to facilitate its entrance into its hole. It is formed with a bulbous or partly spherical head of somewhat larger diameter than the stem. Such a formation of head prevents splitting of the pin under the blows by which it is driven home. When the pin has been driven to such an extent that the widest diameter of the head has come into the plane of the outer surface of the frictional fabric, the projecting part of the head is cut off flush with such surface.

The accompanying drawings illustrate how this invention may be carried into effect.

Figure 2:
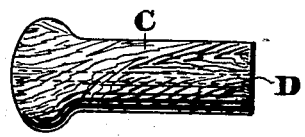
Figure 3:
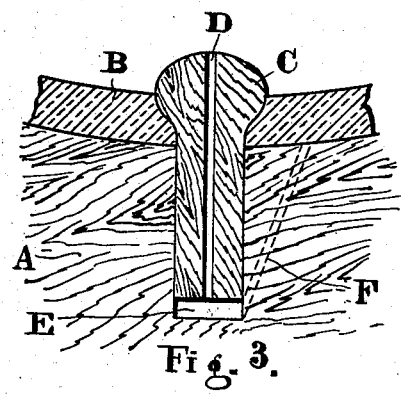
Figure 4:
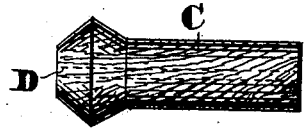

Figure 1 is a perspective view of a complete brake for use for a colliery winding engine. Fig. 2 illustrates a wooden peg provided with an axial hole extending from end to end. Fig. 3 is a fragmentary sectional view of part of the brake shown in Fig. 1, the view being taken along the axis of a wooden peg. Fig. 4 illustrates a wooden peg which differs in form from that shown in Fig. 1.

Referring to Fig. 1, A is a foundation block, and B is a strip of braking fabric secured in place along the face of the block by wooden pegs C. One of such pegs is shown in Fig. 2. This peg is shown in Fig. 3 as driven home in a brake block A, through a strip of fabric B. When so driven home the projecting head of the peg is cut off level with the outer surface of the strip B so to give a flush surface to such strip and its fastening pegs as shown in Fig. 1. The peg C has a hole D extending axially through it from end to end. As will be seen from Fig. 3 this hole D permits free escape of air from the bottom of the hole E in the block A as the peg is driven down such hole. It is impossible for air in a state of compression above atmospheric to accumulate or remain between the end of the peg and the bottom of the hole E. A hole such as is shown at F, Fig. 3, may be drilled through the block A to the bottom of the hole E, any air displaced through the hole F escaping between the contiguous surfaces of the block A and the fabric B.

The head of the peg C may be of other than the spherical form shown in Figs. 2 and 3, while still being of such a formation as to confine the blows of the hammer to the center of the head in order to avoid splitting the pin, and to provide a swelling or equivalent part which prevents the frictional substance B rising from its foundation. A peg with such a modified form of head is shown in Fig. 4 where the outer part of the head is in the form of a truncated cone.

What I claim is:—

A brake block comprising in combination a foundation block, a strip of frictional fabric, non-metallic pegs securing the said fabric to the said foundation block and air vents putting the bottom of the holes containing the pegs in communication with the atmosphere, substantially as described.

In witness whereof I have hereunto set my hand in the presence of two subscribing witnesses.

HERBERT FROOD.

Witnesses:
JOHN O'CONNELL,
FRANK ATTEYS.

Copies of this patent may be obtained for five cents each, by addressing the "Commissioner of Patents, Washington, D. C."